US006829235B1

(12) United States Patent
Musiol

(10) Patent No.: US 6,829,235 B1
(45) Date of Patent: Dec. 7, 2004

(54) TELECOMMUNICATIONS NETWORK WITH PARALLEL SESSION FUNCTION

(75) Inventor: Thorsten Musiol, Düsseldorf (DE)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/913,546

(22) PCT Filed: Feb. 19, 1999

(86) PCT No.: PCT/EP99/01085

§ 371 (c)(1),
(2), (4) Date: Oct. 24, 2001

(87) PCT Pub. No.: WO00/49783

PCT Pub. Date: Aug. 24, 2000

(51) Int. Cl.[7] ......................... H04L 12/66; H04L 12/28; H04L 12/56

(52) U.S. Cl. .................... 370/352; 370/395.5; 370/469; 379/114.01

(58) Field of Search ................................ 370/351, 352, 370/353, 354, 355, 356, 360, 386, 389, 392, 395.5, 422, 469; 379/114.01, 114.03

(56) References Cited

U.S. PATENT DOCUMENTS

| | | | | |
|---|---|---|---|---|
| 5,991,292 A | * | 11/1999 | Focsaneanu et al. | 370/352 |
| 6,377,570 B1 | * | 4/2002 | Vaziri et al. | 370/352 |
| 6,400,722 B1 | * | 6/2002 | Chuah et al. | 370/401 |
| 6,449,272 B1 | * | 9/2002 | Chuah et al. | 370/389 |
| 6,452,925 B1 | * | 9/2002 | Sistanizadeh et al. | 370/352 |
| 6,577,643 B1 | * | 6/2003 | Rai et al. | 370/466 |

FOREIGN PATENT DOCUMENTS

| | | | | |
|---|---|---|---|---|
| EP | 0 868 051 A2 | | 3/1998 | ........... H04L/12/46 |
| EP | 0868051 A2 | * | 9/1998 | ........... H04L/12/46 |
| WO | WO 98/54868 | | 12/1998 | ........... H04L/12/00 |

OTHER PUBLICATIONS

Solomon J: "PPP Over Ethernet (pppoe) bof" Proceedings IETF Meeting, 'Online! Aug. 25, 1998, XP002120353 Retrieved from the Internet: URL:http://www.ietf.cnri.r-eston.va.us/proceedings/98aug/98aug-71.htm (retieved on Oct. 22, 1999).

Routerware: "Redback Networks Adds PPP Over Ethernet to Award-Winning Subscriber Management System" Press Release, 'online! Oct. 9, 1998, XP002107618 Retrieved from the internet: URL:http://www.routerware.com/pr1_main.htm (retrieved on Jun. 29, 1999).

Mamakos, L. et al. "PPP Over Ethernet PPPOE" Internet Draft, 'Online! Sep. 1998, XP002120354 Retrieved from the Internet: URL:ftp://ftp.oce.nl/pub/Internet/documents/internet/internet-drafts/draft-carrel-info-pppoe-01.txt> (retrieved on Jun. 29, 1999).

(List continued on next page.)

*Primary Examiner*—Quoc Tran
(74) *Attorney, Agent, or Firm*—Cohen, Pontani, Lieberman & Pavane

(57) ABSTRACT

A telecommunication network and a process for narrow band data communication between at least one user (PSTN user, ISDN user) and at least one network server (NS) of a service provider, particularly an Internet service provider, with the telecommunication network having a switching unit (LE) to establish a switched connection (dial-up connection) between the user and the network server (NS) and to perform a session (session) for point-to-point (PPP) data exchange between the user and the network server during the switched connection, with the switching unit (LE) having means to establish the switched connection between the at least one user-oriented connection point and an access point (AS). Multiple users (user) are connected together into a local network (LAN), with the data exchange during the session between a central point (LAN/WAN adapter), oriented to the multiple users, and the access server (AS) of the network server (NS) occurring via the data protocol containing the address identification for the respective desired data connection.

6 Claims, 6 Drawing Sheets

OTHER PUBLICATIONS

Blankers P: "Network Solution For Internet Access Service" Ericsson Review, Internet Access Services, Jun. 2, 1998, pp. 4 to 13.

Kwok, et al., An Interoperable End–to–end Broadband Service Architecture over ADSL Systems (Updated Version), System Network Architecture Group (SNAG), ADSL Forum 97–127, Sep. 1997, pp. 1–21.

W. Townsly, et al., "Layer Two Tunneling Protocol "L2TP"", Standards Track, Network Working Group, pp. 1–80, Aug. 1999.

* cited by examiner

TELECOMMUNICATIONS NETWORK WITH PARALLEL SESSION FUNCTION

PRIORITY CLAIM

This is a U.S. national stage of application No. PCT/EP99/01085, filed on Feb. 19, 1999. Priority is claimed on that application and on the following application(s) Country: PCT, Application No.: PCT/EP99/01085, filed: Feb. 19, 1999.

BACKGROUND OF THE INVENTION

1. Field of the Invention

The invention concerns a telecommunication network for narrow band data communication between at least one user and at least one network server of a service provider, particularly an Internet service provider, with the telecommunication network having a switching unit for establishing a switched connection between the user and network server and for implementing a session for point-to-point data exchange between the user and the network server during the switched connection, as well as a process for this purpose.

2. Description of the Related Art

In known telecommunication networks, the establishment of the connection (switched connection) in the narrow band region occurs according to the standards PSTN (public switched telecommunication network) or ISDN (integrated services digital network).

In addition to the use of telecommunication networks for speech connections, they can also serve for data communication between one or more end users (users) and a service provider, e.g. an Internet service provider. Typically, Internet service providers (ISP) operate at specific localized points of presence (POP) with network access servers (NAS), via which the access to the Internet service with the desired Internet protocol address (IP address) occurs. A similar situation results for firms which operate as intranet service providers for external partners. According to the present invention, the general purpose is to obtain an IP-oriented access to the service provider for the user, with the service provider able to be, for example, an Internet service provider or another service, such as a news agency.

The Internet/intranet switched connection access typically occurs via a point-to-point protocol (PPP). Because the network access server is assigned to the respective service provider (and is typically also localized there), only one connection to one single service provider can be established in this way.

Access from a user network (local area network, LAN) causes additional problems. The reason for this, among other things, is that, on one hand, the Internet protocol addresses (IP addresses) are uniquely defined worldwide, but on the other hand, the addresses, typically IP addresses, in a user network with multiple users (private IP) can be assigned as desired independent of this, so that collisions with the Internet IP addresses uniquely defined worldwide can occur. Performing an appropriate adjustment of the IP addresses during a connection using dynamic address assignment by means of known protocols (DHCP and NAT, network address translation) to avoid this problem is known. However, the dynamic assignment of this type necessary for economical use of IP addresses requires a complicated router technology which is difficult for the user to manage.

SUMMARY OF THE INVENTION

The invention has as its object, starting from this point, the further development of a device and/or process of the type initially mentioned in such a way that various parallel data sessions of different point-to-point connections can be established simultaneously via one single physical switched connection.

This object is achieved according to the invention in that the switching unit has means to establish the switched connection between a connection point oriented to the at least one user and an access point for the desired network server, with the data exchange during a session occurring between the user-oriented connection point and the access point via the respective data protocol containing an address identification for the desired point-to-point data connection.

According to the process, this object is achieved in that the data communication connection, in which multiple users are connected into one local area network, occurs between a LAN/WAN adapter acting as a central connection point and the access point allocated to the one or more network servers operated by one or more service providers.

The invention is distinguished in that a data exchange protocol is used, which contains an addressing mechanism, for the production of the data connection between the user-oriented connection point on one hand and the connection point mentioned on the other hand. In this way, multiple point-to-point connections can be produced at the same time via the same switched connection. The solution according to the invention is hereby independent of whether there is one single user or a collection of users, for example PCs located in a local area network. Multiple data sessions are developed on the switched connection, with the accounting on the part of the service provider able to be performed for each individual session. The accounting on the part of the ISDN/PSTN network operator preferably occurs on the basis of the switched connection, with all data sessions of a user or a user group (LAN) thereby being included.

The invention is also distinguished in that a relatively simple configuration of the required adapter (LAN/WAN adapter) is made possible. In addition, it can be seen as an advantage of the invention that there is compatibility in regard to existing systems, which use modems and/or ISDN technology.

Further advantages of the solution according to the invention can be seen in that the concept suits all architectures very well in which the data connections are "directed past" the switching unit (bypass function).

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
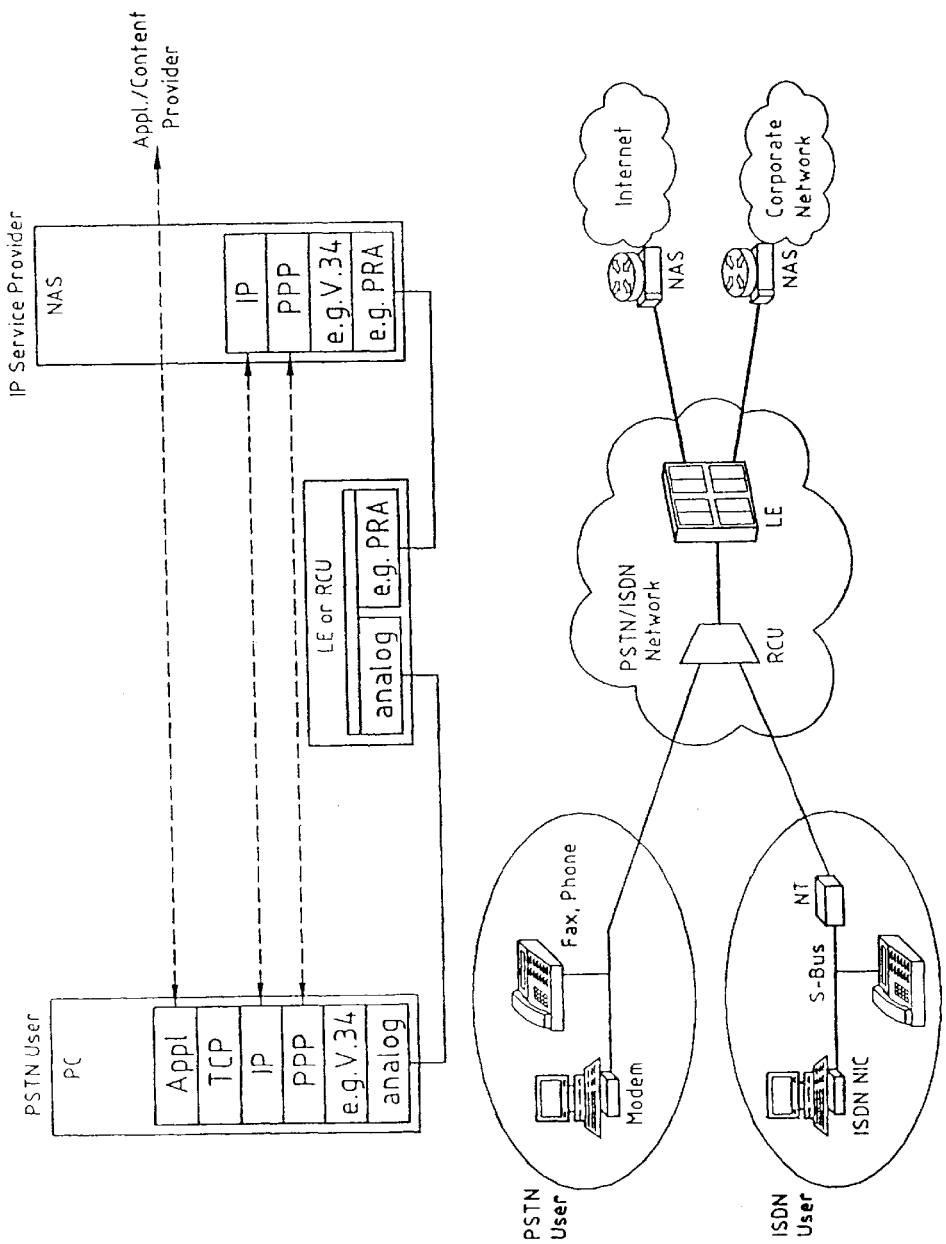
FIG. 1 shows a telecommunication network known from the prior art.

The telecommunication network illustrated in FIG. 1, as it is known from the prior art, consists on the user side of the users assigned to the public switched telecommunication network (PSTN) standard on one hand and/or the users assigned to the integrated services digital network (ISDN) standard on the other hand. Multiple users of this type can be provided in each case. For reasons of clarity, only one of each is illustrated. The network architecture further contains a PSTN/ISDN network (only one exchange is illustrated). In addition, an optionally present remote concentrator unit (RCU) is shown in the image. This contains interfaces, for example VS. 1, V5.2, to a local exchange (LE).

The local exchange operates together with multiple network access servers (NAS), via which the access to the respective service (Internet, corporate network) is made possible. The network access servers (NAS) illustrated here are at specific local points of presence (POP) of a specific service provider.

The upper part of FIG. 1 shows the different layers of the protocol architecture, with only the part related to PSTN illustrated in this example. The lowermost layer is characterized by the physical designation of the network (e.g. analog). The next layer up designates the interfaces used (e.g. V.34). The layer above this designates the data exchange protocol. In the known prior art, this is the typical PPP protocol, via which the IP data traffic occurs. This protocol has the required security and management properties for the administration of the IP addresses. This known "IP via PPP protocol" is a connection-oriented and data session based data exchange protocol.

The known network operates as follows:

First, the establishment of a connection is caused, originating from the user, in that the PSTN/ISDN number of the network access server NAS of the service provider selected is dialed. On this basis, the switching network establishes a switched connection (PSTN/ISDN call) between the user and the network access server NAS and, immediately after its establishment, begins the calculation of charges of the switched connection. Subsequently, the point-to-point data transmission session (PPP session) is established between the user and the network server selected and the appropriate calculation of charges for this session is also begun. Simultaneously with the establishment of the PPP data communication connection, the user identification, the dynamic address assignment, and/or the encryption of the data, known per se, can occur.

In this known network, only one point-to-point data communication connection between the user and the network server selected is possible for each switched connection.

Figure 2:
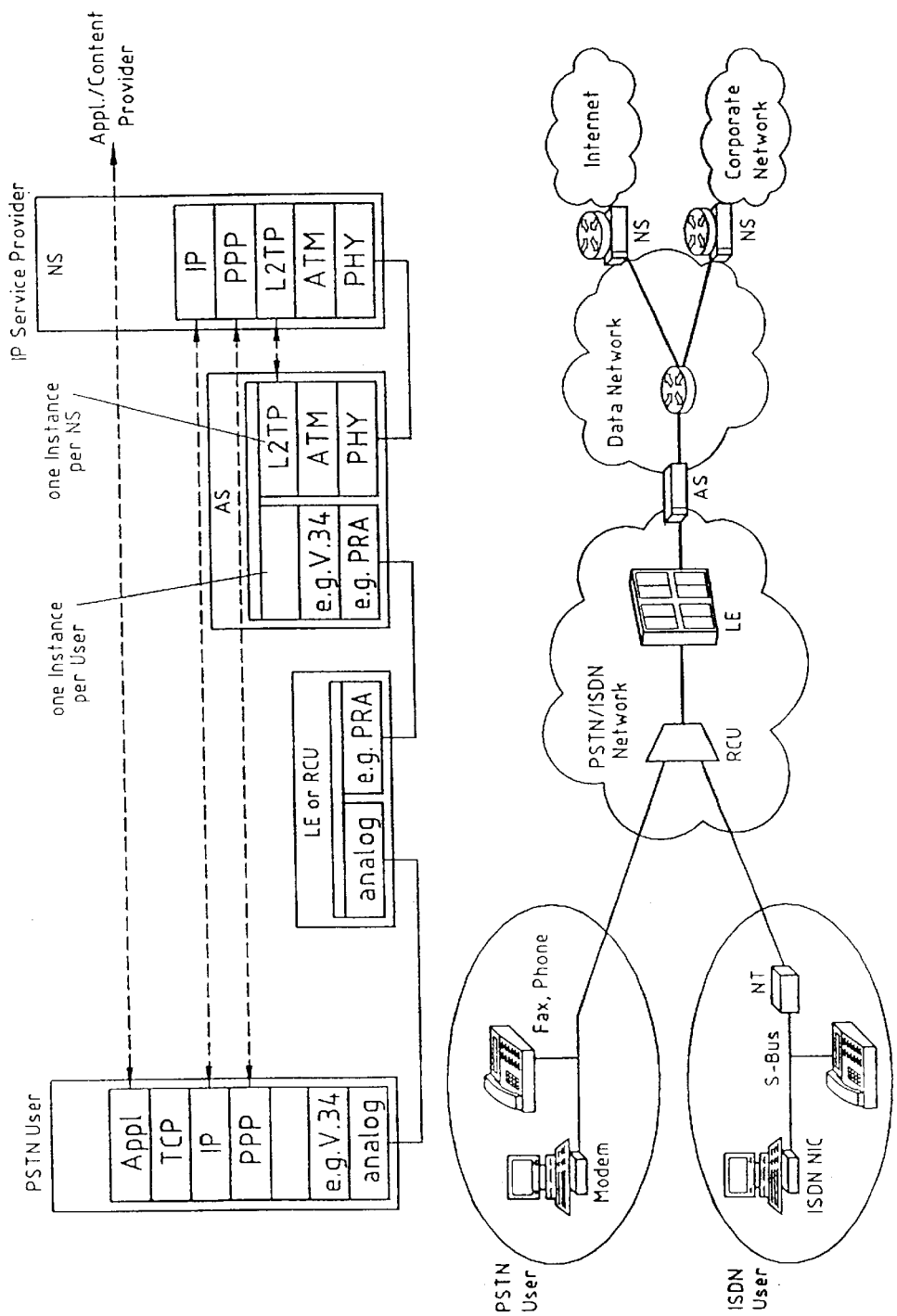
FIG. 2 shows a further telecommunication network known from the prior art.

FIG. 2 shows a further known telecommunication network. This is different from the one illustrated in FIG. 1 in that multiple network servers NS can be connected via a data network to a shared access server AS. The data communication within the data network between the network server NS and the access server AS can occur according to known broadband processes, for example ATM.

On the basis of the protocol structure (PPP) illustrated, only one point-to-point data communication connection can be established between the user and the network server selected for each connection in this known telecommunication network as well.

Figure 3:
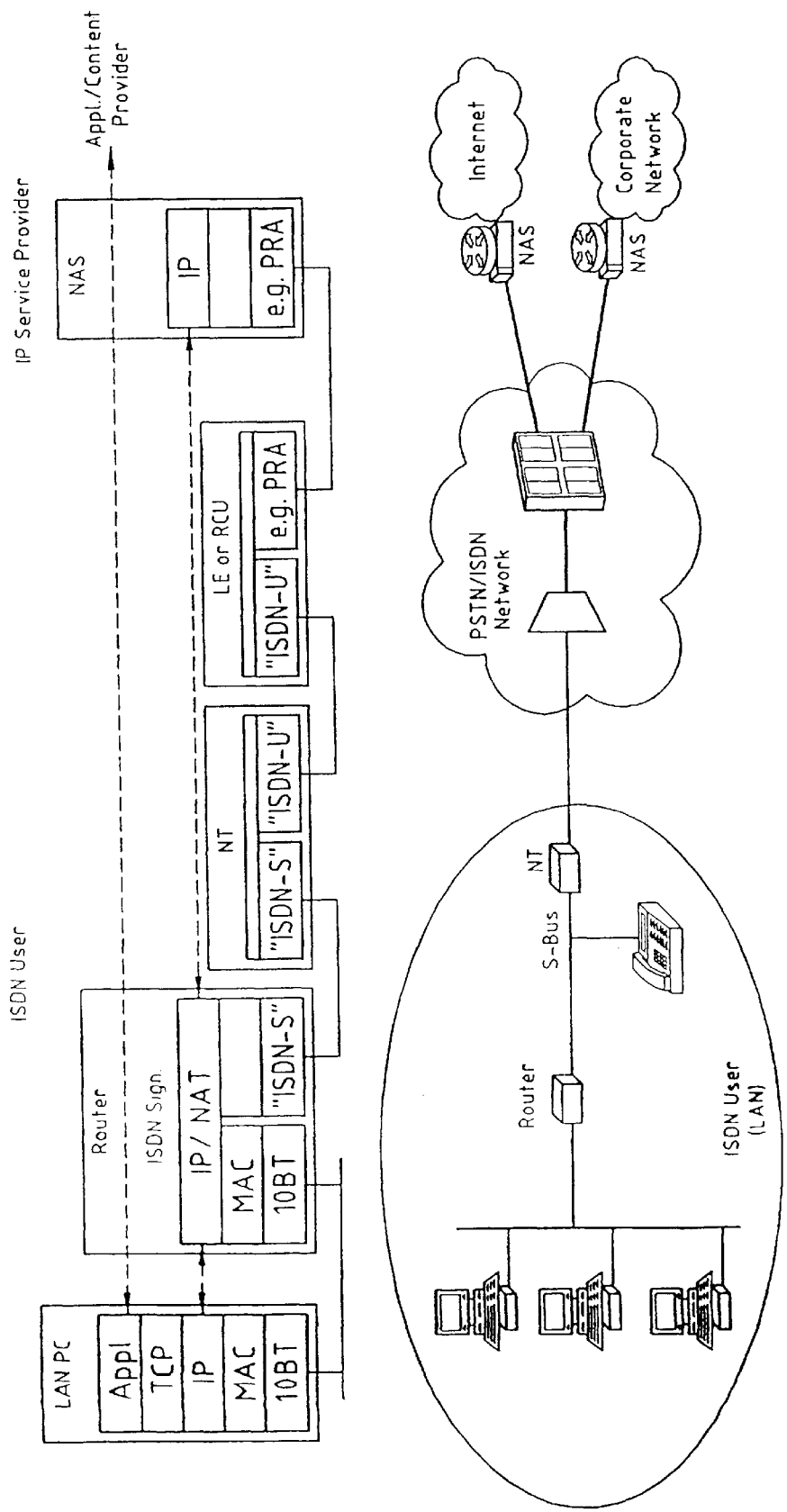
FIG. 3 shows a third telecommunication network known from the prior art.

A third known communication network is illustrated in FIG. 3. This is different from the one illustrated in FIG. 1 in that multiple users are connected to a local area network (LAN). In this example, only the access via ISDN is shown. All of the user PCs are connected via a router with the ISDN line, with the output of the router coupled via an ISDN transfer point NT to the network already described. In this known layout, the problem of possible IP address overlaps exists. One typically attempts to solve this by using IP router technologies, for example according to the standards DHCP and NAT, which are, however, difficult for the user to manage.

Figure 4:
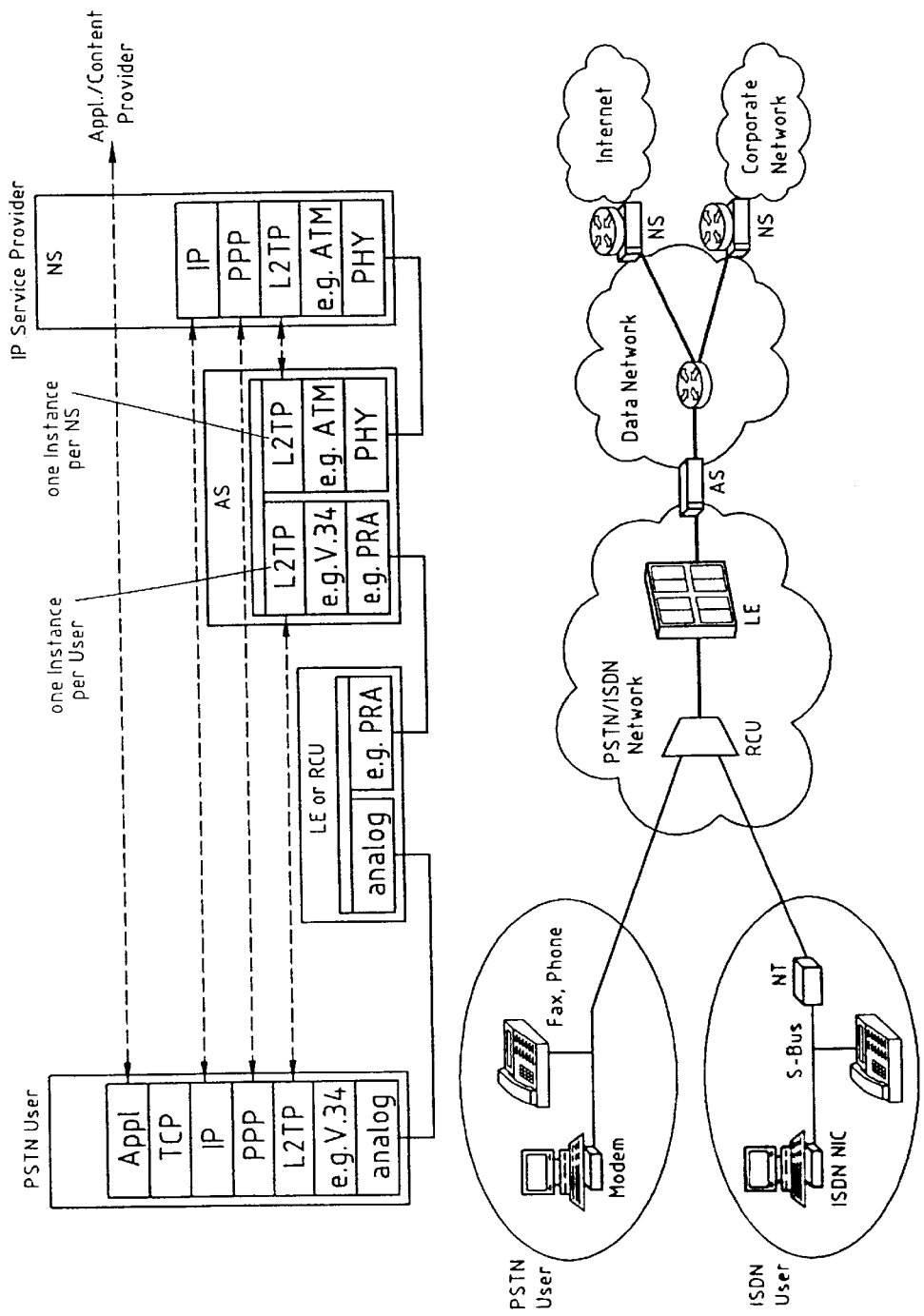
FIG. 4 shows a telecommunication network according to first exemplary embodiment of the invention.

FIG. 4 shows a telecommunication network according to a first exemplary embodiment of the invention.

The design of the network hereby basically corresponds to those described in connection with FIGS. 1 and 2. Thus, multiple analog users (PSTN users) or multiple digital users (ISDN users) work on a PSTN or ISDN network, which is connected via an access server AS with a data network, to which the different network servers NS are assigned.

The upper half of FIG. 4 shows the design of the protocol architecture in the case of an analog network (PSTN user). The particularity of the solution according to this exemplary embodiment is that a switched connection between the user (PSTN user) on one hand and the access server on the other hand is produced, with a data exchange connection (session) occurring according to a layer 2 tunnel protocol, preferably L2TP. This protocol allows an address identification to be transmitted, so that data which are to go to various destinations and/or come from various sources can be transmitted appropriately assigned. Therefore, the ability to implement parallel session operation (multisession) within one established switched connection results. This means that at the same time, multiple data transmission sessions can occur over one single switched connection. This opens up the possibility of the user simultaneously achieving a connection to various network servers of different service providers.

The establishment phase for the data connection therefore runs as follows:

1. The user begins to establish a switched connection.

2. The user dials the number of the desired access server (AS), and does so without having to indicate the address number of the service provider desired.

3. The switching unit establishes a switched connection, for example according to the PSTN or ISDN technique, between the user and the access server AS.

4. The calculation of charges for the PSTN/ISDN switched connection begins.

5. The user begins the L2TP session with the access server. The connection request via the L2TP data protocol hereby includes the address of the desired service provider. This address is used to establish a connection between the access server and the desired network server, with the latter connection preferably, but not necessarily, also established according to the L2TP protocol.

6. The point-to-point data communication session between the user and the desired network server is established. The authentication of the user, the dynamic assignment of IP addresses, and the encryption algorithms can also be implemented via this protocol at the same time.

7. The calculation of fees related to the data session begins.

As a whole, is therefore possible to establish, during the switched connection, parallel point-to-point data communication sessions of one or various user(s) with one or more other service provider(s). This is made possible in that the L2TP protocol offers, in a way, a tunnel through which multiple parallel data sessions can run independent from one another.

Figure 5:
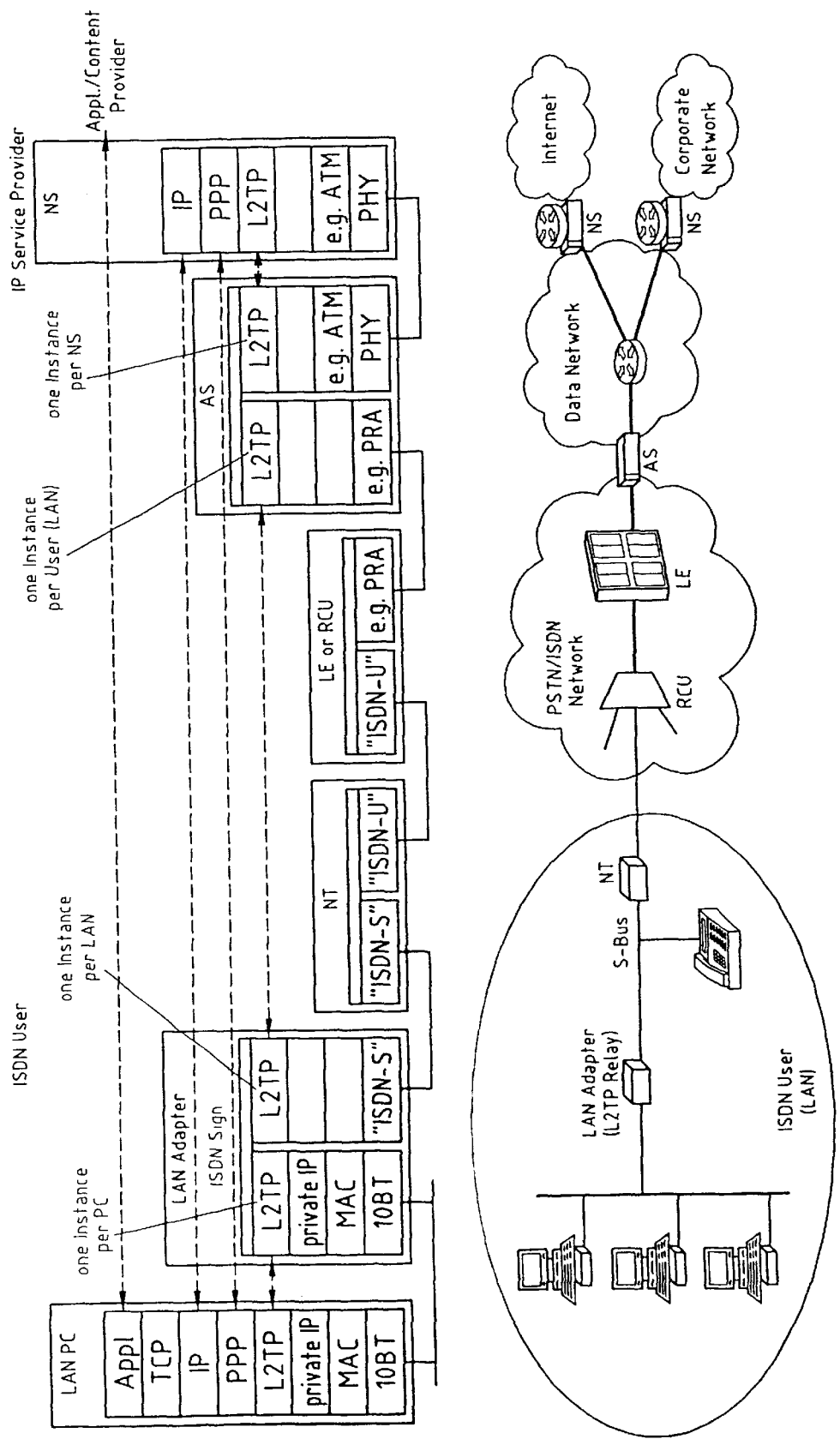
FIG. 5 shows a telecommunication network according to a second exemplary embodiment of the invention.

FIG. 5 shows the design illustrated in FIG. 4 as a second exemplary embodiment of the invention, with, alternatively, instead of individual PC users being attached in the PSTN and/or ISDN mode, a local area network LAN, which is connected to a joint connection point, the so-called LAN/WAN adapter, being formed from various PCs. The connection to the telecommunication network occurs outward from this adapter via the typical ISDN technology (SBus, interface NT).

A private IP address is assigned to each user within the LAN network.

The L2TP protocol is again preferably used as the data communication protocol between the individual users of the LAN network and the LAN/WAN adapter, for which reason the LAN/WAN adapter is also referred to as the "L2TP relay". Further data communications based on L2TP occur from the LAN/WAN adapter to the access server AS of the data network and between the access server AS and the various network servers NS of the service provider.

The establishment of a connection according to the exemplary embodiment illustrated in FIG. 5 proceeds as follows:

1. The user within the LAN network (LAN-PC) establishes an L2TP session with the LAN/WAN adapter, with the existing LAN protocol being used, with use of the private IP within the LAN. The use of the L2TP protocol allows for the LAN-PC to also provide the desired provider addresses within its connection request.

2. If this has not already occurred, the LAN/WAN adapter begins to establish a switched connection.

3. For this purpose, the LAN/WAN adapter dials the number of the desired access server AS.

4. The switching unit establishes a switched connection (e.g. ISDN connection) between the LAN/WAN adapter and the access server AS.

5. The calculation of fees for the switched connection is begun.

6. The LAN/WAN adapter begins an L2TP session with the access server AS, with the address of the desired service provider being relayed.

7. After all of the L2TP connections (tunnel) have been established, the desired point-to-point communication connection between the end-user PC and the desired network server NS is established. In this case as well, the authentication, the dynamic address assignment, and the encryption occur via this layer.

8. The calculation of fees related to the session occurs.

It is significant in this regard that only one single L2TP connection is established between the LAN/WAN adapter and the access server AS. If the user has an external connection request, this is established in the form of a point-to-point data session from each connected PC. The calculation of fees occurs relative to this single switched connection, which is, as a consequence, shared by multiple individual point-to-point data communication sessions. The switched connection is only ended when the last session has ended.

Figure 6:
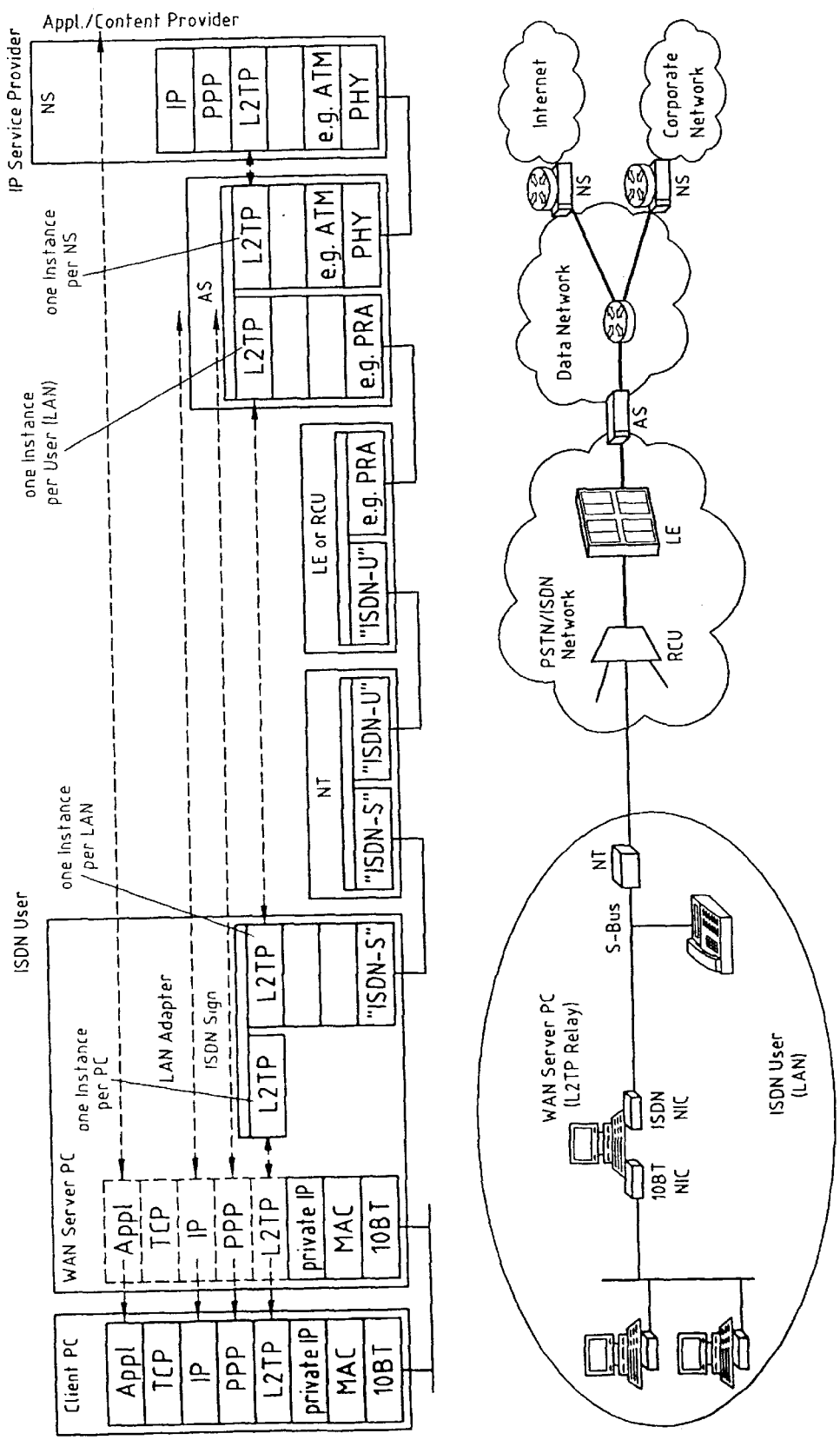
FIG. 6 shows a telecommunication network according to a third exemplary embodiment of the invention.

A third exemplary embodiment of the invention is illustrated in FIG. 6. In this case, a wide area network (WAN) is constructed instead of the local area network (LAN) illustrated in FIG. 5, with the function of the LAN/WAN adapter taken over by a PC implemented as a WAN server. In principle, the mode of operation of the exemplary embodiment illustrated in FIG. 6 corresponds to that constructed in connection with FIG. 5. The layer design also corresponds, as can be seen from the upper part of FIG. 6.

In this variant as well, an L2TP-oriented connection is first established between the individual users (client PC) and the WAN server PC, using the private IP within the wide area network. Subsequently, the establishment of the data communication session between the LAN server PC and the access server AS, as well as between the access server AS and the desired network server NS, occurs.

In this case as well, the desired address of the network server is already contained in the connection request of the end-user and is conducted step-by-step through the single "tunnel" until the point-to-point data communication transmission between the client PC and the desired network server NS is established.

To summarize, the essential concept of the invention is thus connected with the advantage that multiple point-to-point data communication sessions are made possible simultaneously, both for single PC operation and in the case of a local area network.

Multiple user PCs which are connected into a LAN can thus use a single switched connection (PSTN/ISDN) for the IP application. The calculation of fees occurs relative to the single switched connection. This is much simpler than the typical technology, which uses a difficult to manage router.

In addition, the design of the LAN/WAN adapter, the so-called L2TP relay, and its configuration, e.g. the design of the necessary LAN ports and the AS number, is simple.

Except for the part implemented specifically for the transmission media (modem, ISDN, LAN) the design (layer) of the protocol architecture of the user PC is identical. In addition, no separate treatment of the LAN access is required, neither from the side of the service provider nor from the side of the operator. Rather, each LAN PC is to be viewed as an individual user with which a point-to-point data switched connection can be established.

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A process for narrow band data communication between at least one user (PSTN user, ISDN user) and at least one network server (NS) of a service provider, in which first the establishment of a switched connection between the user and an access point (AS) occurs and subsequently, during the connection, a data exchange session (session) occurs as a point-to-point connection between the user and the network server, with the establishment of the switched connection occurring between a user-oriented connection point and an access point for the desired network server, characterized in that multiple users are connected together into a local area network (LAN); and the data communication connection between a LAN/WAN adapter acting as a central connection point and the access point (AS) of the network server (NS) of the desired service provider occurs via a data protocol (L2TP) containing an address identification for the respective desired point-to-point (PPP) data connection, wherein the establishment of a data communication connection, consisting of the following steps:

the user initiates the establishment of the connection;

the user dials the number of the access server (access server);

the switching network produces a PSTN/ISDN switched connection between the user and the access server (AS);

the calculation of fees of the PSTN/ISDN switched connection begins;

the user begins a data exchange session (session) with the access server, with the address (e.g. ATM, FR) of the service provider being contained in the data exchange protocol and the address being used to produce the desired connection between the access server and the network server of the desired service provider;

a point-to-point data connection (PP) between the user and the desired network server (NS) is produced, with, in particular, the user authentication, the IP address assignment, and the encryption also occurring via the data exchange protocol; and the calculation of fees in regard to the session is begun.

2. The process according to claim 1, characterized in that the data communication connection occurs between one single user PC and the access server (AS) of a data network of multiple network servers (NS).

3. The process according to claim 1, in which multiple users are connected together into a local area network (LAN), characterized in that the data communication connection occurs between a LAN/WAN adapter acting as a central connection point and the access point (AS) of the network server (NS) of the desired service provider.

4. The process according to claim 3, characterized in that the data exchange occurs between the LAN/WAN adapter and the access server (AS) of a data network of multiple network servers (NS).

5. A process for narrow band data communication between at least one user (PSTN user, ISDN user) and at least one network server (NS) of a service provider, in which first the establishment of a switched connection between the user and an access point (AS) occurs and subsequently, during the connection, a data exchange session (session) occurs as a point-to-point connection between the user and the network server, with the establishment of the switched connection occurring between a user-oriented connection point and an access point for the desired network server, characterized in that multiple users are connected together into a local area network (LAN); and the data communication connection between a LAN/WAN adapter acting as a central connection point and the access point (AS) of the network server (NS) of the desired service provider occurs via a data protocol (L2TP) containing an address identification for the respective desired point-to-point (PPP) data connection, wherein multiple users are connected together into a local area network (LAN), characterized in that the data communication connection occurs between a LAN/WAN adapter acting as a central connection point and the access point (AS) of the network server (NS) of the desired service provider, and wherein the establishment of a data communication connection between multiple users connected together into a LAN network and at least one network server (NS) of an Internet protocol service provider comprises the following steps:

the user (LAN-PC) begins a data session with the LAN/WAN adapter, with the address of the desired service provider being contained in the data exchange protocol;

the LAN/WAN adapter initiates an establishment of an ISDN connection;

the LAN/WAN adapter dials the number of the access server (AS);

the switching unit produces a switched connection (ISDN connection) between the LAN/WAN adapter and the access server (AS);

the calculation of fees for the ISDN connection begins;

the LAN/WAN adapter starts a data exchange connection (session) with the access server (AS), with the address of the desired network server being relayed;

a point-to-point (PPP) data communication connection is implemented between the user and the network server, with the user authentication, the IP address assignment, and/or the encryption occurring via the data exchange protocol; and the calculation of fees in regard to the data session begins.

6. A process for narrow band data communication between at least one user (PSTN user, ISDN user) and at least one network server (NS) of a service provider, in which first the establishment of a switched connection between the user and an access point (AS) occurs and subsequently, during the connection, a data exchange session (session) occurs as a point-to-point connection between the user and the network server, with the establishment of the switched connection occurring between a user-oriented connection point and an access point for the desired network server, characterized in that multiple users are connected together into a local area network (LAN); and the data communication connection between a LAN/WAN adapter acting as a central connection point and the access point (AS) of the network server (NS) of the desired service provider occurs via a data protocol (L2TP) containing an address identification for the respective desired point-to-point (PPP) data connection, wherein multiple users are connected together into a local area network (LAN), characterized in that the data communication connection occurs between a LAN/WAN adapter acting as a central connection point and the access point (AS) of the network server (NS) of the desired service provider, characterized in that the data exchange occurs between the LAN/WAN adapter and the access server (AS) of a data network of multiple network servers (NS), and wherein the establishment of a data communication connection between multiple users connected together into a LAN network and at least one network server (NS) of an Internet protocol service provider comprises the following steps:

the user (LAN-PC) begins a data session with the LAN/WAN adapter, with the address of the desired service provider being contained in the data exchange protocol;

the LAN/WAN adapter initiates an establishment of an ISDN connection;

the LAN/WAN adapter dials the number of the access server (AS);

the switching unit produces a switched connection (ISDN connection) between the LAN/WAN adapter and the access server (AS);

the calculation of fees for the ISDN connection begins;

the LAN/WAN adapter starts a data exchange connection (session) with the access server (AS), with the address of the desired network server being relayed;

a point-to-point (PPP) data communication connection is implemented between the user and the network server, with the user authentication, the IP address assignment, and/or the encryption occurring via the data exchange protocol; and the calculation of fees in regard to the data session begins.

* * * * *